United States Patent Office 3,006,901
Patented Oct. 31, 1961

3,006,901
NON-IGNITABLE ELASTOMERS
Benjamin D. Halpern, Jenkintown, Wolf Karo, Elkins Park, and Albin H. Gapsch, Philadelphia, Pa., assignors to The Borden Company, New York, N.Y., a corporation of New Jersey
No Drawing. Filed Apr. 25, 1958, Ser. No. 730,777
1 Claim. (Cl. 260—78.5)

This invention relates to non-ignitable organic elastomers. In particular it relates to curable, non-ignitable organic polymers which are rubbery in nature and can be readily shaped and formed by conventional rubber-processing equipment.

In accordance with this invention, we provide a series of new polymers which do not burn even when in contact with a flame. The novel polymers of this invention are addition copolymers formed from a monomer mixture of 40 to 97 parts by weight of trifluoroethyl acrylate and 3 to 60 parts by weight of a ethylenic bond polymerizable monomer containing no other atoms than carbon, hydrogen and oxygen. Rigid and elastomeric products can be prepared, depending on the comonomer selected. Excellent elastomeric properties are obtained where the comonomer is selected from the group consisting of maleic anhydride, acrylic acid, methacrylic acid, fumaric acid and the alkyl, di-alkyl and glycol di-esters thereof. Rigid products of excellent strength are formed from high proportions of a vinyl comonomer such as styrene.

The elastomeric copolymers of this invention are curable in the presence of sulfur and an amine to yield a rubbery material which is not ignitable with ordinary illuminating gas flames. These copolymers may be modified by fillers and reinforcing agents and in general can be handled by normal rubber-processing equipment for mixing, shaping and curing. In raw, uncured form these elastomeric polymers are transparent and useful as safety-glass interlayers where heat and fire resistance may be critical as in jet and rocket aircraft. Also, the uncured form, when used as a fabric coating, provides high flame resistance for the fabric without affecting color.

The polymerization may be done in bulk, emulsion or suspension. Any of the conventional organic peroxy compounds and azo compounds may be used as catalysts to initiate bulk or suspension polymerization. In emulsion systems water-soluble initiating systems of "redox" initiators are preferable. The usual range of concentration of catalysts is 0.1 to 0.3% by weight based on the monomer, though concentrations as low as 0.025% or as high as 1.00% may be used.

The trifluoroethyl ester of acylic acid is prepared by reacting trifluoroethanol (B.P. 74.05° C., $d_{22°}$ 1.3739 g./ml.) with acrylyl chloride in the presence of triethylamine. The physical properties of trifluoroethyl acrylate are: boiling point, 91–92° C.; refractive index at 25° C., 1.3475.

Examples illustrative of this invention are given below. Examples I and II are suspension systems and Example III is a bulk system.

*Example I*

22.4 gms. of trifluoroethyl acrylate 0.02 gm. of benzoyl peroxide and 1.95 gms. of maletic anhydride were mixed together and dispersed in 100 mil. of 0.3% aqueous solution of polyvinyl alcohol. The mass was transferred to a beverage bottle, sealed with a crown cap, and then shaken in 80° C. water bath for 24 hours. The resulting mixture comprised granules of polymer precipitated in the aqueous solution. The granules were filtered and repeatedly washed with warm water to provide an 83% yield of an approximately 92%–8% copolymer.

*Example II*

18.6 gm. of trifluoroethyl acrylate and 4.9 gm. of maleic anhydride were heated to form a homogeneous solution, 0.2 gm. of benzoyl peroxide mixed in, and the resultant heated mixture dispersed in a beverage bottle with 100 ml. of 0.3% aqueous solution of polyvinyl alcohol previously heated to 80° C. The bottle was then sealed with a crown cap and shaken for 24 hours in an 80° C. water bath for 24 hours. The resulting precipitate of copolymer granules was filtered and worked with water to provide a 74% yield of the 79%–21% copolymer.

In a similar manner as in Example I and II, copolymers are formed by reacting 75 to 96 parts by weight of trifluoroethyl acrylate with 4 to 25 parts by weight of the following —C=O-containing monomers: ethyl acrylate, methyl methacrylate, acrylic acid, butyl acrylate, octyl acrylate, decyl acrylate, di-isooctyl fumarate, diisooctyl maleate, dioctryl fumarate, dioctyl maleate, ethylene glycol dimethacrylate, polyethylene glycol dimethacrylate, and methoxypolyethylene glycol acrylate.

These comonomers can be polymerized in bulk as exemplified by Example III.

*Example III*

In a heavy-walled test-tube were placed 1.54 gms. of trifluoroethyl acrylate, 1.90 gms. of ethyl acrylate and 0.007 gm. of benzoyl peroxide. The solution was frozen at —70° C. and the air space partially evacuated. While maintaining a low pressure the test tube was sealed off. The closed test tube was then heated in a bath at 80° C. for 12 hours: the tube was then opened to yield the 45%–55% copolymer.

In each of the above cases, the resultant copolymer is a transparent rubbery material which neither burns nor supports combustion when exposed to the hottest portion of a Bunsen burner supplied with illuminating gas. In addition the ethylacrylate copolymers exhibited exceptionally good low temperature flexibility.

Further, each of the products is compoundable with such common ingredients as fillers and reinforcing agents and vulcanizable with amine-sulfur systems. Examples of fillers which do not affect the non-ignitability are inorganic salts and oxides e.g. silica. An example of a vulcanizing system is triethyltetramine and sulfur.

We claim:
The addition copolymer of 40–97 parts by weight of 2,2,2-trifluoroethyl ester of acrylic acid with 3–60 parts of maleic anhydride.

References Cited in the file of this patent

UNITED STATES PATENTS

| | | |
|---|---|---|
| 2,472,811 | Dickey | June 14, 1949 |
| 2,628,958 | Bittles | Feb. 17, 1953 |
| 2,642,416 | Ahlbrecht | June 16, 1953 |
| 2,782,184 | Husted et al. | Feb. 19, 1957 |

OTHER REFERENCES

Bovey et al.: Journal of Polymer Science, vol. XV, pp. 520–536 (1955).